UNITED STATES PATENT OFFICE.

CARL DUISBERG, OF ELBERFELD, GERMANY.

BLUE COLORING-MATTER FROM TETRAZODIPHENYL.

SPECIFICATION forming part of Letters Patent No. 357,273, dated February 8, 1887.

Application filed December 14, 1885. Serial No. 185,643. (Specimens.)

*To all whom it may concern:*

Be it known that I, CARL DUISBERG, of Elberfeld, in the Empire of Germany, chemist, and assignor to the Farbenfabriken vorm. Friedr. Bayer & Co., have invented a new and useful Improvement in the Manufacture of Dye-Stuffs or Coloring-Matters, of which the following is a specification.

My invention relates to the production of a new blue color for dyeing on cotton, wool, and silk by the action of tetrazodiphenoldimethylester upon the alpha monosulpho acid of the alpha naphthol.

In carrying out my process practically, I proceed as follows: Ten (10) kilos diamidodiphenoldimethylester (dianisidin) [produced by the alkaline reduction of the nitrophenolmethylester (nitroanisol) and transforming the so-obtained hydrazophenoldimethylester (hydrazoanisol) with concentrated acids] are dissolved in one hundred and fifty liters water and twenty (20) kilos of muriatic acid of the specific gravity of 1.161. To the solution so obtained and cooled by ice six (6) kilos sodium nitrite dissolved in water are gradually added. In this way a reddish-yellow solution of tetrazodiphenoldimethylester is formed. This solution is now added to a solution of twenty-two (22) kilos of the soda salt of alpha naphthol alpha monosulpho acid (obtained by sulphonizing alpha naphthol or by the decomposition of diazotized alpha naphtionic acid) and ten (10) kilos soda to four hundred liters water. A dark violet-blue solution is formed, which is precipitated by common salt. After some time filter and dry. In this way a product of the following composition is formed:

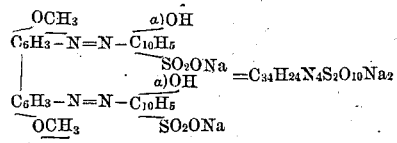

This forms in a dry state a black amorphous powder, with a little bronze hue, which dissolves very easily in water, giving a violet-blue color. By an alkaline lye (ammonia and soda lye) it dissolves into a deep-red color; by concentrated sulphuric acid into a deep indigo-green-blue color. It dyes cotton not mordanted in a boiling bath containing alkaline, and develops best with phosphate of soda or with carbonate of potash into a deep blue, is fast to warm soap, and possesses the valuable property to be fast to mineral acids.

I am aware of the United States Letters Patents to Griess, Nos. 213,563 and 213,564, of March 25, 1879, and do not claim the compounds or processes there described.

What I claim as my invention, and desire to secure by Letters Patent, is—

1. The process of producing the new coloring-matter herein described, which consists in azotizing the diamidodiphenoldimethylester (ether) (dianisidin) obtained by reducing the nitrophenolmethylester (ether) with alkaline substances, and transforming the so-obtained hydrazophenoldimethylester (ether) with acids, with sodium nitrite forming the tetrazodiphenoldimethylester, (ether,) and combining it with the sodium or any other salt of alpha naphhtol monosulpho acid.

2. The coloring-matter herein described, which is produced by the action of tetrazodiphenoldimethylester (ether) upon the alpha naphthol, alpha monosulpho acid, and which is a black amorphous powder with a bronze hue, forming a violet solution when dissolved in water, and which forms a deep-red coloring-matter with alkalies, and with concentrated sulphuric acid produces a deep indigo-green-blue color, and with phosphate of soda or carbonate of potash as a mordant it is fast to soap solutions and to mineral acids, substantially as described.

CARL DUISBERG.

Witnesses:
ANTHONY GREF,
WILLIAM A. POLLOCK.